Jan. 7, 1930. L. LEONARD 1,742,512
ROLLER BEARING
Filed March 10, 1927

Inventor
Laurence Leonard

Attorney

Patented Jan. 7, 1930

1,742,512

UNITED STATES PATENT OFFICE

LAURENCE LEONARD, OF LOS ANGELES, CALIFORNIA

ROLLER BEARING

Application filed March 10, 1927. Serial No. 174,330.

This invention relates to roller bearings constructed of steel or iron of the necessary thickness, and hardened or tempered to degree necessary, and particularly, to split roller bearings, having a general application and adapted to various types of shafts and analogous devices.

Objects of the invention are to provide a bearing of the class specified, having a comparatively few parts and a reduction of wear; ready accessibility of the several parts for replacement; advantageous free oiling, either by splash or pressure, and wherein true alignment of the bearing is maintained after placement, so that it cannot side-slip, or become inclined or creep before tightening the same relatively to a shaft or journal, and the same is also true after it has been fitted to shaft or journal.

A further object of the invention is to so construct and arrange the several parts of a roller bearing that rollers are positively held in place and wherein oil is allowed, either by pressure, splash feed, or seepage oiling system, to reach and lubricate the rollers, and also, to so place the rollers at regularly spaced intervals or irregular intervals, or in groups, and also, to so place the rollers relative to a dead center so that they will be most effective in the performance of their function as anti-frictional supports for the shaft or journal in engagement therewith: i. e. these sets of variations can be grouped or otherwise spaced from dead center according to the use of the bearing.

A further object of the invention is to provide a bearing of the type specified, wherein time and labor consumed in the manufacture thereof are reduced to a minimum, in view of the simplicity of the several parts and the readiness of assemblage thereof in operative relation, and wherein also it will be impossible to burn out the bearing, and also permit ready adjustment of the same by the insertion of new, oversized rollers, all of which is permissible in view of the particular construction of the several parts.

A still further object of the invention is to provide an improved means of securing the working surface upon an axle or journal where the anti-frictional rollers of a roller bearing operate without the use of an inner wearing sleeve, and also, in accomplishing the advantageous results just specified, render the several parts, which are materially reduced in number, more readily installed and easier to handle in transportation.

With these and other objects and advantages in view, as more fully hereinafter set forth, the invention consists in the preferred construction and arrangement of the several parts which will be more fully hereinafter particularly described and pointed out in the appended claims.

Figure 1:
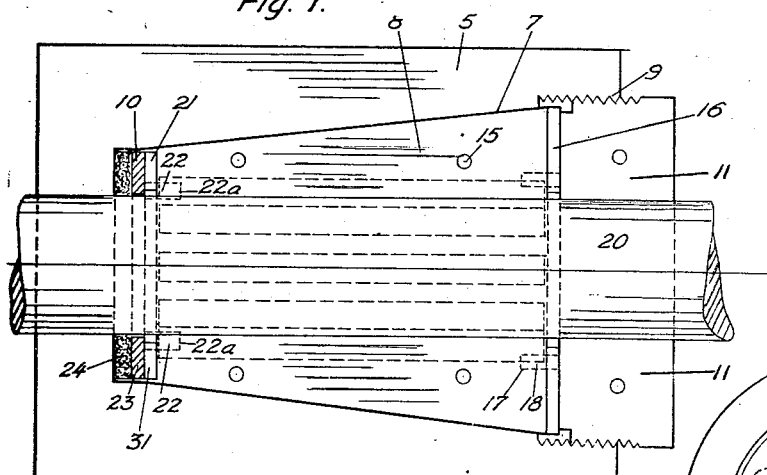
Figure 1 is a top plan view of one half of the improved bearing.

The numeral 5 designates a bearing housing which may be of any suitable dimensions, and is preferably made in halves, which are united or joined by any suitable means, and at the sides have metal or material of which the housing is formed cut away or removed at an angle, as at 6, to correspondingly reduce the thickness of the wall of the housing in accordance with a semi-frusto-conical recess 7, constructed in each half of the housing and conjointly forming a frusto-conical seat having mounted therein and also made in two semi-frusto-conical sections a bearing sleeve 8 of similar contour. The recess 7 in each half of the housing extends fully through one end or communicates with a longitudinal straight screw threaded opening 9, the opposite reduced terminal of the recess communicating with a semi-cylindrical recess 10 which terminates at a distance from the rear end of the housing sections or halves, as shown particularly by Figure 1. The opening 9 in each section or half of the housing conjointly forms with a cerresponding structure in the remaining housing half or section a circular seat in which an exteriorly threaded adjusting split nut is mounted and comprises two sections 11, the nut sections being held in assembled relation by matching pins 12 projecting from one of the nut sections into recesses or slots 13 in the remaining split nut half or section. Within the frusto-conical seat provided by the semi-frusto-conical recesses 7, when the two parts of the housing are assembled, the bearing sleeve 8 is mounted and is held associated or intact by matching pins 14 carried by one section and entering sockets 15 in the remaining section of this sleeve, and against the enlarged end of the bearing sleeve 8 of the form just described is applied a sectional roller locking ring 16, having sockets, the pins 17 extending from bearing sleeve 8 and into the locking ring 16. Within the two sections of the bearing sleeve 8, roller seats 18ª are formed and have therein rollers 19 which may be either solid or tubular, as desired, or of any suitable form, and projects far enough inwardly from their seats to engage the shaft or journal 20 with which the improved bearing is associated. It will be understood that the several dowel pins serve as matching pins for the semi-frusto-conical bearing sleeve members or sections, the roller locking ring 16 and the adjusting split nut sections to which they are applied. The rollers 19 are disposed longitudinally straight with respect to the bearing sleeve members or sections, and terminate at the reduced extremities of the latter, and have a smaller roller locking ring 21 fitted closely against the reduced extremity of the members or sections of the bearing sleeve and also of split construction, and also having dowel or matching pins 22 secured to the sections thereof fitting in sockets in adjacent portions of the reduced ends of the members or sections of the bearing sleeve. The smaller locking ring 21 is located in the rear recess or seat 10, and between the locking ring and the rear wall of said recess or seat, a shim or washer 23 and a felt washer 24 are adapted to be inserted, and when the parts are thus associated, the split-nut 11 is inserted in place and tightly binds all parts of the bearing, including the rollers, within the housing against the least displacement, inclination or other irregular position. It will thus be seen that the entire bearing structure is accurately positioned relatively to the shaft 19 or other journal with which it is associated, and does not require the least adjustment or manipulation after it has been associated with the housing. To render the split adjusting nut readily operatable, the outer end thereof is formed with a head 25 with a plurality of openings or sockets 26 therein for engagement by a spanner or other tool for tightening or releasing said split-nut.

Figure 2:
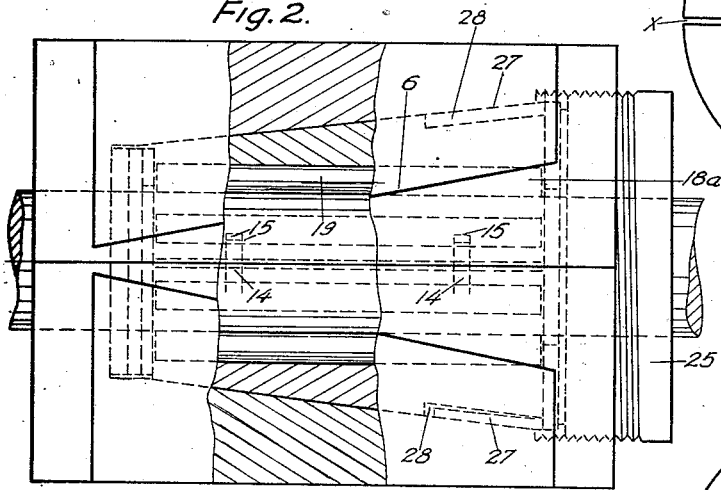
Figure 2 is a top plan view of the bearing partially broken away and in section.
Figure 5:
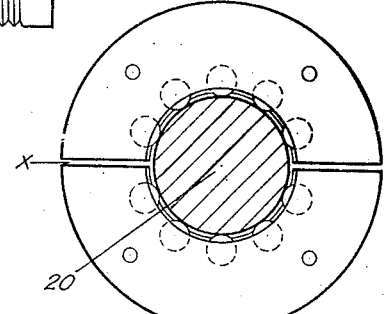
Figure 5 is an end elevation of the opposite of the end of the bearing, looking towards the larger roller locking ring with the housing illustrated as removed and the shaft shown in section.
Figure 3:
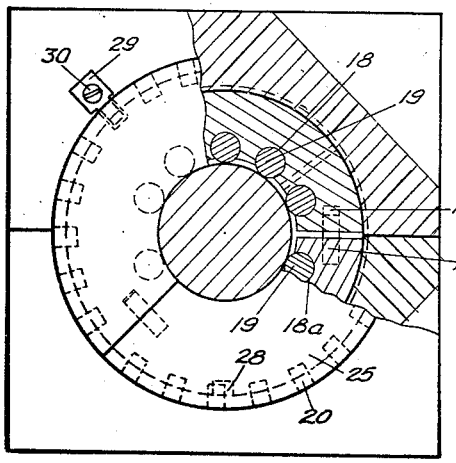
Figure 3 is a front end elevation of the improved bearing partially broken away and in section.

When the bearing sleeve is inserted in the housing, it is further obstructed against movement by keys at opposite points of the housing, as at 27, entering keyways 28 formed in the members or sections of the bearing sleeve, as shown by dotted lines, particularly in Figure 2. Furthermore, when the adjusting split-nut has been applied and adjusted against the larger extremity of the associated members or sections of the bearing sleeve, it may be locked by a securing device or clip 29, which is separably held in fixed relation by a set screw 30. When it is desired to remove the split-nut 11, the securing clip 29 is released by removing the screw 30.

Figure 6:
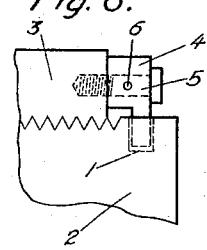
Figure 6 is a view showing the locking device for holding the split nut against circumferential movement.
Figure 4:
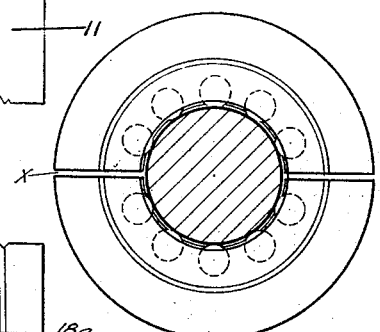
Figure 4 is an end elevation of the smaller end of the bearing and smaller locking ring with the housing removed, and the shaft shown in section.

Figure 6 of the diagram shows the locking device for holding the split-nut from loosening.

1. One of the plurality of openings or sockets therein of the split-nut.
2. Split-nut.
3. Large end of housing facing.
4. Steel L, end of which fits into plurality of openings or sockets in split-nut.
5. Cap screw.
6. Hole for cotter key, through L and cap screw to prevent loosening.

The rollers 19 cannot work or move out of the channels or recesses 18ª formed in the bearing sleeves 8 in the sections or members, as heretofore described, and even though the rollers break, they cannot move endwise outwardly from the sections of the bearing sleeve for the reason that the presence of the locking rings 16 and 21 obstructs such movement. The recesses or channels 18ª in the bearing sleeve are slightly larger than the rollers mounted therein, and said sleeve is split longitudinally through the center, the inner recesses of the sleeve sections being semi-cylindrical, and the opening through the sleeve, when the sections or members of the latter are united, closely and accurately fitting the shaft or journal mounted therein. It will be understood that the said sleeve, as a whole, will be formed of a good quality of steel and tempered to render the same practically durable and efficient in service. The roller locking rings 16 and 21 provide shoulders against which the ends of the rollers are adapted to abut and have an endwise rotation. The bearing sleeve and locking rings are associated in such manner that they will have a positive association when applied to the housing. This bearing sleeve can be made in any size and dimensions, and the parts that directly cooperate therewith will, of course, be correspondingly modified, and the outer surface thereof will be of a conical contour of any degree of angularity, and the two members or sections thereof are positively secured against displacement, one with respect to the other, as heretofore explained. The housing is formed with an inside flange where the seat 10 is formed for the insertion and application of the roller locking ring 21, or at the small end or extremity of the bearing sleeve 8, and by this means an annular recess is formed, as at 31, to retain the oil or grease applied by forced feed, drip or pack. The felt washer 24 may be supplemented by additional similar washers, or a single washer used, as shown, and operates in either case to retain the oil or lubricating means. This annular recess obviously holds the felt washer or washers and shims in place, especially where the bearing may be open at the small end, for instance, as used on a propeller shaft or pinion bearing, and whereby the oil or grease is permitted to seep through the bearing. The lock nut 11 provides a novel adjustment for the bearing sleeve 8 and the rollers 19 at one and the same operation, there being no chance for the bearing sleeve to slip back or become loose after this nut is tightened against the larger end of the sleeve. The split nut turns against the adjacent locking ring 16, and through the latter the bearing sleeve 8 and rollers therein move through the conical seat of the housing and tighten down on the shaft or journal. By this means, a single or one takeup operation of the improved bearing ensues, without requiring other adjustment. This adjustment is rendered possible by the construction and arrangement of the several parts of the bearing and especially of the bearing sleeve and the parts directly associated therewith. Another feature of the present construction is that the housing 7 in which the bearing sleeve is mounted may be of any size or shape.

A further advantage of the improved bearing is the use of keys 27 and keyways 28 between the bearing sleeve 8 and the housing 7, and whereby a true alignment of the bearing sleeve upon entering the housing is had. The bearing sleeve is further prevented from turning or shifting within the housing by said keys and keyways, and when pressure is applied to said sleeve through the split adjusting nut, the sleeve is held in correct operating position after the adjustment has been made.

It will also be understood that all of the parts generally may be modified in details of construction within the scope of the invention, and further, that the proportions and dimensions may be varied to accommodate different applications of the improved bearing.

What is claimed as new is:

1. A roller bearing including a shaft, a two-membered boxing fitting therearound and spaced therefrom, said boxing being provided when assembled with a frusto-conical bore terminating at one end in a reduced cylindrical bore and at the other end in an enlarged interiorly threaded cylindrical bore, a roller carrier composed of two sections, the outer surface of the same being frusto-conical to fit within the frusto-conical bore of the boxing, means for holding the same within the boxing against circumferential movement, and a two-membered retaining ring exteriorly threaded and adapted to fit in the threaded bore of the boxing to hold the roller carrier against longitudinal displacement.

2. A roller bearing including a shaft, a two-membered boxing fitting therearound and spaced therefrom, said boxing being provided when assembled with a frusto-conical bore terminating at one end in a reduced cylindrical bore and at the other end in an enlarged interiorly threaded cylindrical bore, a roller carrier composed of two sections, the outer surface of the same being frusto-conical to fit within the frusto-conical bore of the boxing, means for holding the same within the boxing against circumferential movement, a two-membered retaining ring exteriorly threaded and adapted to fit in the threaded bore of the boxing to hold the roller carrier against longitudinal displacement, said carrier being provided with a plurality of longitudinal recesses of more than semi-cylindrical shape, the same being open at the ends and through the inner face of the carrier, a plurality of cylindrical rollers one each mounted in a recess the ends terminating adjacent the ends of the carrier, and retaining rings attached to the two ends of the carrier to limit the longitudinal movement of the rollers, one of the rings being disposed within the small cylindrical bore of the boxing and the larger ring being adjacent to and abutted by the two-membered retaining ring.

3. A roller bearing including a shaft, a two-membered boxing fitting therearound and spaced therefrom, said boxing being provided when assembled with a bore terminating at one end in a reduced cylindrical bore and at the other end in an enlarged interiorly threaded bore, a roller carrier composed of two sections, the outer surface of the same being shaped to fit within the main bore of the boxing, means for holding the same within the boxing against circumferential movement, and a two-membered retaining ring exteriorly threaded and adapted to fit in the threaded bore of the boxing to hold the roller carrier against longitudinal movement.

In testimony whereof I have hereunto set my hand.

LAURENCE LEONARD.